(12) United States Patent
Yen et al.

(10) Patent No.: US 10,990,573 B2
(45) Date of Patent: Apr. 27, 2021

(54) FAST INDEX CREATION SYSTEM FOR CLOUD BIG DATA DATABASE

(71) Applicant: SYSCOM COMPUTER ENGINEERING CO., Taipei (TW)

(72) Inventors: Chen-Yu Yen, Taipei (TW); Pei-Fen Hu, Taipei (TW); Shu-Yuan Hu, Taipei (TW); Kun-Ting Chiu, Taipei (TW)

(73) Assignee: SYSCOM COMPUTER ENGINEERING CO., Taipei (TW)

( * ) Notice: Subject to any disclaimer, the term of this patent is extended or adjusted under 35 U.S.C. 154(b) by 281 days.

(21) Appl. No.: 16/248,799

(22) Filed: Jan. 16, 2019

(65) Prior Publication Data

US 2020/0226116 A1 Jul. 16, 2020

(51) Int. Cl.
*G06F 16/22* (2019.01)
*G06F 16/2453* (2019.01)

(52) U.S. Cl.
CPC ...... *G06F 16/2272* (2019.01); *G06F 16/2246* (2019.01); *G06F 16/2282* (2019.01); *G06F 16/24542* (2019.01)

(58) Field of Classification Search
CPC ............. G06F 16/2272; G06F 16/2246; G06F 16/2282; G06F 16/2542
USPC ......................................... 707/715, 741–746
See application file for complete search history.

(56) References Cited

U.S. PATENT DOCUMENTS

| 7,672,928 B2* | 3/2010 | Maloney ............. G06F 16/2272 707/715 |
| 10,673,880 B1* | 6/2020 | Pratt ....................... G06N 20/00 |
| 2004/0006460 A1* | 1/2004 | Katayama ............. G06F 16/332 704/10 |
| 2014/0108434 A1* | 4/2014 | Goldberg ................ H04L 67/10 707/753 |
| 2020/0183934 A1* | 6/2020 | Mathur ............. G06F 16/24542 |

* cited by examiner

*Primary Examiner* — Hares Jami
(74) *Attorney, Agent, or Firm* — Fei-hung Yang

(57) ABSTRACT

A fast index creation system for a cloud big data database electrically and communicatively coupled to a cloud non-relational database for inquiring and creating an index includes an application exchange module, a data exchange module, a first processing module, a second processing module and an integrated processing module. The application exchange module receives a query string inputted by a user and prompts a result index table. The data exchange module has a temporary index table. The first processing module computes the query string and generates a query instruction to compute a temporary index table for comparison and check if there is any data matched with the query instruction. If yes, then the first processing module will generate a cache index table, or else the first module will generate a create instruction provided for the second processing module to compute a non-relational database and generate a new index table.

10 Claims, 2 Drawing Sheets

FAST INDEX CREATION SYSTEM FOR CLOUD BIG DATA DATABASE

FIELD OF INVENTION

The present invention relates to a fast index creation system, in particular to the fast index creation system for a cloud big data database.

BACKGROUND OF INVENTION

1. Description of the Related Art

With the evolution of computers, paper or various analog data are converted into digital information and saved in form of digital files on the computer, and users can access, delete, modify or even add these data. Users save the data in a specific block by a certain method, and these data and other applications are independent sets which are databases. For the access of database, a database management system (DBMS) is developed as a software system for managing the database or protecting the data and information in the database. In the present architecture, the database management system is electrically and communicatively coupled to the database for directly accessing the data of the database.

Therefore, when users fetch the data or calculate the statistics of the data, the data fetch path is from the user end to the database management system, and then the required data are searched one by one in the database and returned to the user end through the original path. Wherein, a query instruction is inputted from the user end to instruct the computer to sort the data or calculate the statistics of the data according to the requirement. However, the operation of the aforementioned database management system is very slow and time-consuming, and the hardware service time is reduced by the large number of times of reading and writing the database.

In view of the aforementioned drawbacks, the inventor of the present invention based on years of experience in the related industry to conduct extensive research and experiment, and finally provided a fast index creation system for a cloud big data database to overcome the drawbacks of the prior art.

2. Summary of the Invention

Therefore, it is a primary objective of the present invention to provide a fast index creation system for a cloud big data database and build a system with novel architecture which is capable of inquiring data in a cloud big data database and improving the index creation efficiency as well as the efficiency of fetching the data or calculating the statistics of the data.

To achieve the aforementioned and other objectives, the present invention provides a fast index creation system for a cloud big data database, and the fast index creation system is electrically and communicatively coupled to a cloud non-relational database and a user service system and provided for inquiring and creating an index. The fast index creation system comprises an application exchange module, a data exchange module, a first processing module, a second processing module and an integrated processing module. The application exchange module is electrically and communicatively coupled to the user service system for receiving a query string inputted from the user service system and provided for prompting a result index table to the user service system. The data exchange module is electrically and communicatively coupled to the non-relational database and has at least one temporary index table stored therein, and the temporary index table has field data related to record data of the non-relational database. The first processing module is electrically and communicatively coupled to the data exchange module and the application exchange module and provided for receiving and computing the query string to generate a query instruction. The query instruction includes at least one key field and at least one sorting condition. The first processing module computes the temporary index table according to the query instruction for comparing the temporary index table to check whether or not the temporary index table has any data same as the key field and then generate a cache index table, a create instruction, or both. Wherein, if the temporary index table has data same as the key field, then the first processing module will compute the temporary index table and generate the cache index table according to the query instruction. If the temporary index table does not have any data same as the key field, then the first processing module will generate the create instruction. The second processing module is electrically and communicatively coupled to the data exchange module, the first processing module and the non-relational database and provided for receiving the create instruction and the query instruction and computing the non-relational database according to the query instruct/ion to generate the newly created index table. The integrated processing module is electrically and communicatively coupled to the first processing module, the second processing module, the data exchange module and the application exchange module and provided for receiving and computing the cache index table, the newly created index table, or both according to the query instruction to generate the result index table, wherein the result index table has field data related to record data of the non-relational database and is returned to the application exchange module. By computing the temporary index table in the application exchange module, the index table is created directly to prevent entering into the non-relational database directly for the operation or reducing the performance of the system operation. Therefore, the index creation can be accelerated significantly to improve the user's fetching the data or calculating the statistics of the data.

Further, the data exchange module receives the result index table and computes the result index table and the temporary index table to update the temporary index table. Therefore, the data exchange module can generate the corresponding result index table according to the query string of the user's latest instruction, replace and update the original temporary index table, so as to improve the efficiency of creating the index for next time.

In addition, the fast index creation system for a cloud big data database supports asynchronous programming to create the index, so as to achieve the effects of reducing the synchronous communication between different modules of this system, lowering the burden during the process of creating the index, and facilitating users' operation. Wherein, the application exchange module is provided for receiving a plurality of same or different query strings, and the integrated processing module computes and generates the result index tables according to the corresponding query instructions and drives the application exchange module to prompt the result index tables to the user service system.

Preferably, the data exchange module has a plurality of temporary index tables stored therein. If different temporary index tables have data same as the key field, then the first processing module will compute and combine the temporary index tables to generate a joint data table. Therefore, the joint data table has data same as the key fields and the data are provided for the first processing module to compute the joint data table according to the query instruction to generate the cache index table. For the different temporary index tables having the data same as the key fields, the index creation efficiency can be improved.

In addition, the fast index creation system for a cloud big data database supports filtered index to create an index according to a user's commonly used query string and improves the index creation efficiency. Wherein, the temporary index table further has at least one tag field, and the tag field has data related to record data of the non-relational database. If the key field points at the tag field, the first processing module will compute the tag field according to the query instruction and will generate the cache index table, the create instruction or both.

Further, the temporary index table, the cache index table, the newly created index table and the result index table has a data structure of B-tree. Since balance number have good data order, therefore the fast index creation system for a cloud big data database can retrieve one of the data more quickly.

In summation, the fast index creation system for a cloud big data database in accordance with the present invention can inquire a cloud non-relational database and create indexes. In particularly, the system is capable of improving the index creation efficiency significantly. Wherein, the data exchange module is capable of using the temporary index table to compare field data and the key field quickly to facilitate generating the cache index table. Therefore, users can avoid the access burden of the conventional database, and the system can improve the index creation index significantly.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Recently, the architecture of database and corresponding database management systems are changed because of the rise of big data and the rapid development of cloud. In a big data database, it is necessary to read and write a very large number of data continuously without interruption, and these data come with different formats. In addition, the databases may be divided according to the data format for storage and their applicable language into relational databases and non-relational databases (NoSQL). Further, the big data database keeps increasing its data, and the system architecture of the conventional relational database requires extremely high-performance hardware devices and servers for support, and thus incurring a high development cost and an increased maintenance cost.

Figure 1:
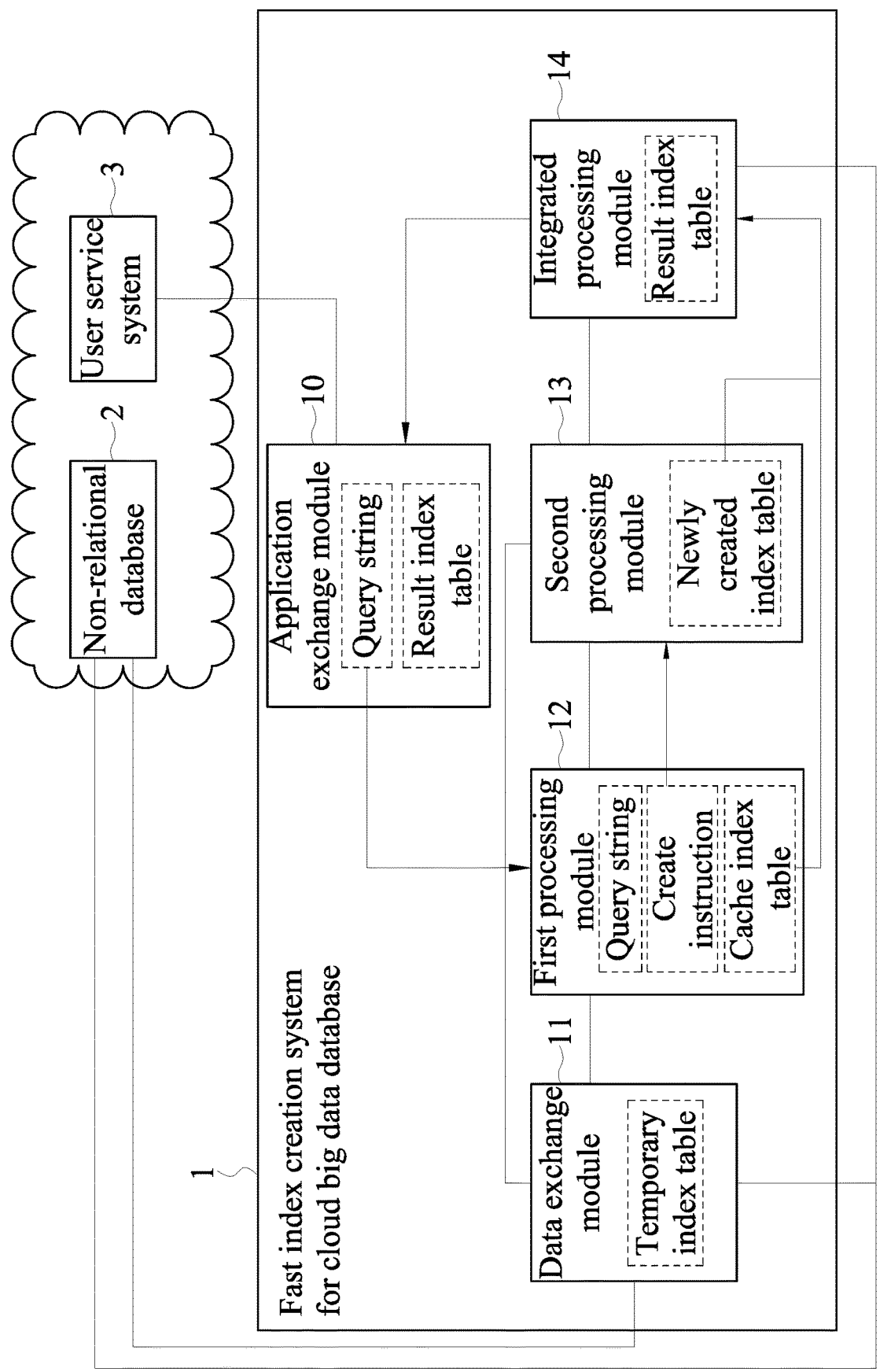
FIG. 1 is a system block diagram of a preferred embodiment of the present invention.
Figure 2:
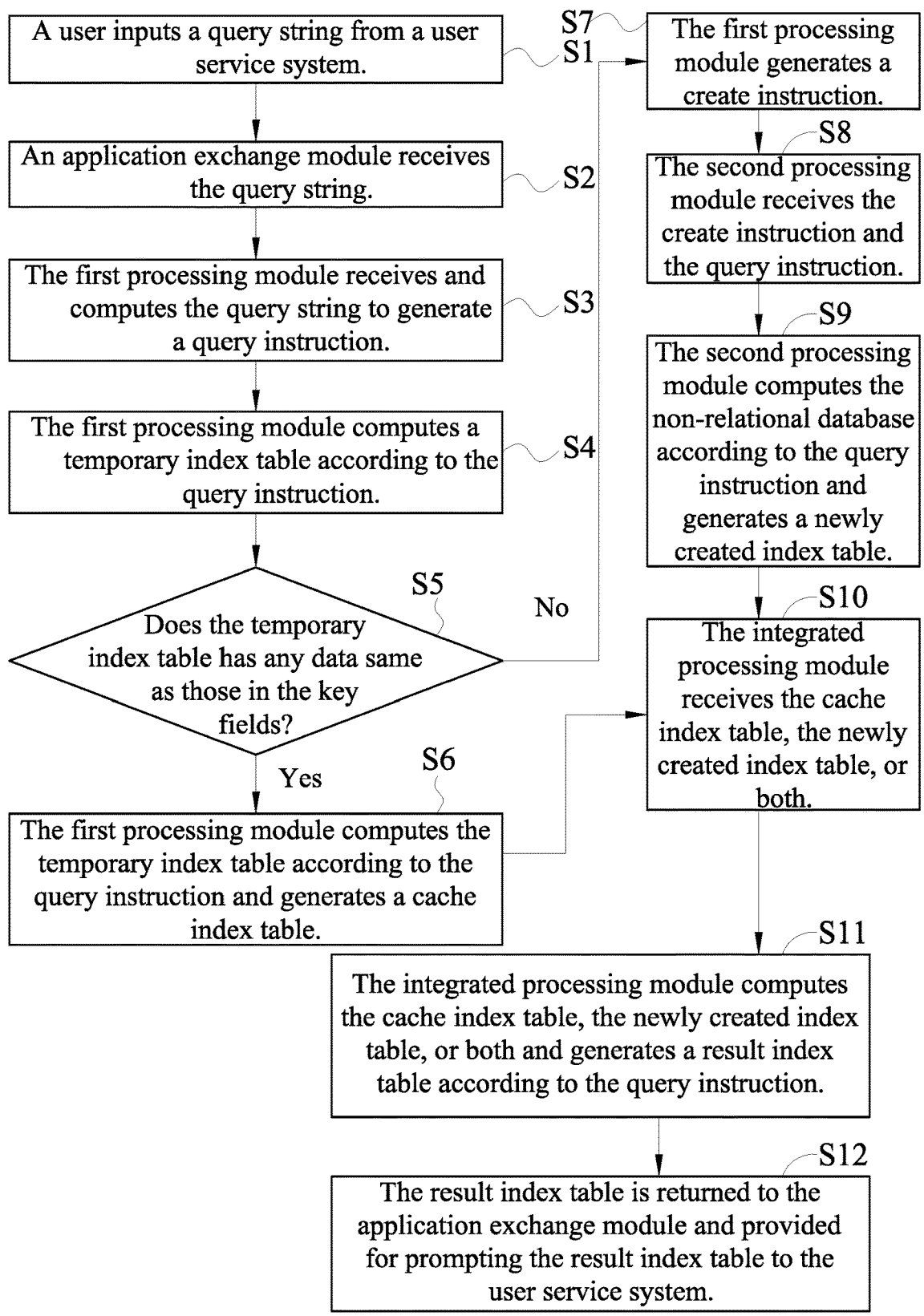
FIG. 2 is a system flow chart of a preferred embodiment of the present invention.

To cope with the application of big data databases and clouds, the inventor of the present invention builds a new system architecture comprising a big data database created in a cloud, an application service layer system and a user interface system, wherein a non-relational database is used as the big data database provided for the application service layer system to store big data into the database and return the big data to the user interface system. With reference to FIGS. 1 and 2 for a system block diagram and a system flow chart in accordance with a preferred embodiment of the present invention respectively, the present invention provides a fast index creation system for a cloud big data database 1 serving as the application service layer system and electrically and communicatively coupled to a cloud non-relational database 2 and a user service system 3 serving as the big data database and the user interface system respectively. The non-relational database 2 with the feature of good horizontally expanded database capacity can be installed to a lower-cost computer device (not shown in the figure) and a server (not shown in the figure) while providing a large database capacity up to the level of TB or PB. In this embodiment, the non-relational database 2 is an industrial online database such as the Cassandra developed by Facebook which is capable of expanding new column families dynamically, providing good extensibility and performance, and supporting a structured query language (SQL).

Users can inquire, analyze, update, add or delete data of the non-relational database 2 through the user service system 3 and use the SQL to define the required data field and its sorting and filtering conditions which are provided for a system to create an index. The index includes a plurality of fields, and some fields are stored with the address of a database, and sorted by a certain specific method to accelerate the search of data in the database. Therefore, a simpler and more specific instruction issued by a user will result in a higher efficiency of obtaining the required data from the user service system 3. The system architecture of the present invention is shown in FIG. 1, and the invention does not simply provide a fast index accessing system only, but improves the system according to the index creation method and accelerates the index creation efficiency, so as to improve the efficiency for users to obtain the required data.

In FIGS. 1 and 2, the fast index creation system for a cloud big data database 1 comprises an application exchange module 10, a data exchange module 11, a first processing module 12, a second processing module 13 and an integrated processing module 14. The application exchange module 10 is electrically and communicatively coupled to the user service system 3 which serves as a communication platform for the communication of the user service system 3. The application exchange module 10 is provided for receiving a query string inputted from the user service system 3 and prompting a result index table to the user service system 3. In addition, the data exchange module 11 is electrically and communicatively coupled to the non-relational database 2 and stored with at least one temporary index table. The first processing module 12 is electrically and communicatively coupled to the data exchange module 11 and the application exchange module 10 and provided for receiving and computing the query string to generate the query instruction. The first processing module 12 generates a cache index table, a create instruction or both according to different conditions, and the create instruction is transmitted to the second processing module 12. The second processing module 12 is electrically and communicatively coupled to the data exchange module 11, the first processing module 12 and the non-relational database 2 and provided for generating a newly created index table in specific conditions. The integrated processing module 14 is electrically and communicatively coupled to the first processing module 12, the second processing module 13, the data exchange module 11 and the application exchange module 10 and provided for receiving the cache index table, the newly created index table, or both to generate the result index table, and transmitting the result index table to the application exchange module 10.

Further, the tables related to this system are index tables including the temporary index table, the cache index table, the newly created index table and the result index table. The temporary index table is an index table generated by computing the data in the non-relational database 2 by the data exchange module 11 according to the predetermined data field and its sorting and filtering conditions. Therefore, the temporary index table has field data related to record data of the non-relational database 2. In addition, the cache index table is an index table generated by sorting or deleting after retrieving the temporary index table, and the newly created index table is an index table generated by re-computing the non-relational database 2.

The flow chart of the operation of the fast index creation system for a cloud big data database 1 will be described in details below.

Step S1: A user inputs the query string from the user service system 3.

Step S2: The application exchange module 10 receives the query string.

Step S3): The first processing module 12 receives and computes the query string to generate the query instruction. For example, a user filters or analyze the file data in the non-relational database 2 according to specific conditions in order to retrieve data, and a SQL language is used to input the query string. The query string will be transmitted to the application exchange module 10 and then transmitted to the first processing module 12, and the query language will be converted into an assembly language or a machine language, so as to generate the query instruction. The query instruction includes at least one key field and at least one sorting condition corresponding to the target file data and specific conditions of the query string respectively. Preferably, both of the key field and the sorting condition come with a plural quantity.

Step S4: The first processing module 12 computes the temporary index table according to the query instruction when the index is created.

Step S5: The field data in the temporary index table are compared to check whether or not the temporary index table has data that is the same as the key fields. If yes, then the first processing module 12 will search target file data in the temporary index table of the data exchange module 11 and will indirectly go to the database for the search to save the processing time and power consumption significantly.

Step S6: If the temporary index table has the same data as the key fields, then the first processing module 12 will compute the temporary index table and generate the cache index table according to the query instruction.

Step S7: If the temporary index table does not have the same data as the key fields, then the first processing module 12 will generate the create instruction to drive the second processing module 13. On the other hand, if the temporary index table only has some data same as the key fields and some data can found in the temporary index table, then the first processing module 12 will generate the cache index table and the create instruction at the same time.

Step S8: If the first processing module 12 cannot find any target file data in the data exchange module 11, then the create instruction will notice the second processing module 13, so that the second processing module 13 will create a new index table into the non-relational database 2. In other words, the second processing module 13 receives the create instruction and the query instruction.

Step S9: The second processing module 13 computes the non-relational database 2 according to the query instruction and generates the newly created index table.

Step S10: The integrated processing module 14 receives the cache index table, the newly created index table or both.

Step S11: The integrated processing module 14 computes the cache index table, the newly created index table, or both according to the query instruction to generate the result index table. Therefore, the field data in the result index table are related to record data of the non-relational database 2. In other words, the result index table is an index table generated and fed back as needed after the user inputs the query string.

Step S12: The result index table is returned to the application exchange module 10 and provided for prompting the user service system 3. Therefore, modules at two stages are used to create the index, and the data exchange module 11 is installed to serve as a smaller database for the initial stage of creating the index. If the data exchange module 11 does not have any target file data, then the non-relational database 2 will be accessed to retrieve data and integrate and create the index at the final stage. Preferably, the data exchange module 11 is an index table for storing the temporary index table, so that its capacity is small and the operational efficiency can be improved. Particularly, the first processing module 12 computes the temporary index table first and avoids the heavy burden of computing data in the non-relational database 2, and this arrangement can accelerate the index creation and improve the efficiency of retrieving data or calculating the statistics of data by the users.

Further, the fast index creation system for a cloud big data database 1 will remove the junk files in a specific time, and the junk files include those temporary files without substantial data such as the files with a filename extension .TMP or .tmp.cvr in order to maintain the operational efficiency of each module. Preferably, when the result index table is returned to the application exchange module 10, the result index table will also be transmitted to the data exchange module 11 at the same time and provided for the data exchange module 11 to compute, update, and replace the originally stored temporary index table. Therefore, the most updated index table will be stored in the data exchange module 11 and provided for creating an index quickly for the next time when a user inputs the same or similar query string.

In addition, each module of the fast index creation system for a cloud big data database 1 is an independent operating module, so that no mutual coordination is required for the operation of each module. The fast index creation system for a cloud big data database 1 supports asynchronous programming. The application exchange module 10 can receive a plurality of same or different query strings at the same time or not at the same time, and the integrated processing module 14 computes and generates the result index tables according to the query instructions and drives the application exchange module 10 to prompt the result index tables to the user service system 3. For example, after a user has inputted the query string, the user may input another query string while waiting for the receipt of the corresponding result index table time, and the modules will not interfere with one another during the operation process. The data exchange module 11 will wait after the previous query string has been processed or completed, or the previous the result index table has updated the temporary index table before processing the next query string by the first processing module 12 or the second processing module 13. If two users enter different query strings at the same time, the module will not coordinate will one another before deciding the order of the operations of the query strings, and the programming of to this system made by a user will not interfere with another programming made by the other user. In a specific period, the presently existed temporary index table and non-relational database 2 are data, and each module will generate the corresponding result index tables according to the operation of the query instructions. Therefore, the processing time for creating, inserting, updating or deleting an index table can be decreased substantially to improve the operational efficiency of each module, and the user's wait time can be reduced significantly to provide a more convenient use.

Further, the temporary index table, the cache index table, the newly created index table and the result index table have a data structure of B-tree. The B-tree structure includes a root node, a symmetric relay layer node expanded from the root node, and one or more leaves under the relay layer node. On the other hand, the index type of the aforementioned index tables can be cluster index, non-cluster index, filtered index, plugin index or any combination of the above. Preferably, the aforementioned index tables have both non-cluster index and cluster index at the same time, wherein the left key just has a pointer stored therein but will not sort, and the pointer points at the real address of the cluster index or data in the non-relational database 2, so that the left key can store more non-sorted data to reduce the time of reading the index table during the operation of each module. Since the balance number has good data sequence, therefore the fast index creation system for a cloud big data database 1 can retrieve the data more quickly.

Further, the fast index creation system for a cloud big data database 1 also supports the filtered index, so that an index can be created more quickly the query strings which are commonly used by users. Wherein, the temporary index table has at least one tag field (not shown in the figure), and the tag field relates to a condition of a special type and it is related to the record data of the non-relational database 2. If the key field points at the tag field, then the first processing module 12 will compute the tag field and generate the cache index table, the create instruction or both according to the query instruction.

In another embodiment, the data exchange module 11 has a plurality of temporary index tables stored therein, and the temporary index tables are separate tables. In the step S4 as shown in FIG. 2, if one of the temporary index tables has some data same as the key fields while another temporary index table or some other temporary index tables have data of other parts, then the first processing module 12 will find the temporary index tables having the data same as the key fields data and compute the temporary index tables and combine these temporary index files to generate a joint data table (not shown in the figure). Therefore, the joint data table is an index table obtained by combining a plurality of temporary index tables. The first processing module 12 will compute the joint data table and generate the cache index table according to the query instruction, and then the step S10 will be carried out afterward. When the data same as the key fields are distributed in different temporary index tables, the index creation efficiency can be improved.

Preferably, the fast index creation system for a cloud big data database 1 also supports a smart index or an automatic index. In a period of time, the first processing module 11 computes the query instructions which become history records and generate a new query instruction, so that each module can create, delete or combine the index tables automatically to compute the query instruction, and finally update the temporary index table. Therefore, the fast index creation system for a cloud big data database 1 is more convenient-to-use and smarter.

In summation of the description above, the fast index creation system for a cloud big data database 1 in accordance with the present invention can inquire a cloud non-relational database 2 and create an index, and specially improve the index creation efficiency. The data exchange module 11 computes the temporary index table for comparing the field data and the user inputted key field quickly, so that the cache index table can be created quickly, or the second processing module 13 creates the newly created index table provided for the integrated processing module 14 to generate the result index table. Preferably, the fast index creation system for a cloud big data database 1 supports various types of indexes including filtered indexes, asynchronous indexes and automatic indexes to improve its operation efficiency. Therefore, the users can avoid the burden of accessing the database with the conventional architecture. This invention can improve the index creation efficiency significantly.

What is claimed is:

1. A fast index creation system for a cloud big data database, electrically and communicatively coupled to a cloud non-relational database and a user service system, for inquiring and creating an index, comprising:
one or more hardware processors;
an application exchange module executed by the one or more hardware processors, electrically and communicatively coupled to the user service system, for receiving a query string inputted from the user service system;
a data exchange module executed by the one or more hardware processors, electrically and communicatively coupled to the cloud non-relational database, and having at least one temporary index table with field data related to record data of the cloud non-relational database;
a first processing module executed by the one or more hardware processors, electrically and communicatively coupled to the data exchange module and the application exchange module, for receiving and computing the query string to generate a query instruction, and the query instruction including at least one key field and at least one sorting condition; the first processing module computing the at least one temporary index table according to the query instruction and comparing the at least one temporary index table to the at least one key filed of the query to check whether or not the at least one temporary index table has any data that is same as the at least one key field and then generating a cache index table, a create instruction, or both; wherein, if the at least one temporary index table has data that is same as the at least one key field, then the first processing module will compute the at least one temporary index table according to the query instruction to generate the cache index table; and if the at least one temporary index table does not have data that is same as the at least one key field, then the first processing module will generate the create instruction;
a second processing module executed by the one or more hardware processors, electrically and communicatively coupled to the data exchange module, the first processing module and the cloud non-relational database, for receiving the create instruction and the query instruction and computing the cloud non-relational database according to the query instruction to generate an index table; and an integrated processing module executed by the one or more hardware processors, electrically and communicatively coupled to the first processing module, the second processing module, the data exchange module and the application exchange module, for receiving and computing the cache index table, the index table or both according to the query instruction to generate a result index table, and the result index table has field data related to record data of the cloud non-relational database and returned to the application exchange module for prompting the result index table to the user service system to let the user service system know that the result index table has been generated.

2. The fast index creation system for a cloud big data database according to claim 1, wherein the data exchange module receives the result index table and computes the result index table and the at least one temporary index table to update the at least one temporary index table.

3. The fast index creation system for a cloud big data database according to claim 2, wherein the application exchange module is provided for receiving a plurality of same or different query strings simultaneously, and the integrated processing module is provided for computing and generating the result index tables according to the query instructions, and driving the application exchange module to prompt the result index tables to the user service system.

4. The fast index creation system for a cloud big data database according to claim 3, wherein the data exchange module has a plurality of temporary index tables; and if different temporary index tables have data that is same as the at least one key field, the first processing module will compute to combine the plurality of temporary index tables to generate a joint data table, and the first processing module will compute the joint data table according to the query instruction to generate the cache index table.

5. The fast index creation system for a cloud big data database according to claim 1, wherein the at least one temporary index table further has at least one tag field, and the at least one tag field has data related to the record data of the cloud non-relational database, and when the at least one key field points at the at least one tag field, the first processing module computes the at least one tag field according to the query instruction to generate the cache index table, the create instruction, or both.

6. The fast index creation system for a cloud big data database according to claim 1, wherein the at least one temporary index table, the cache index table and the index table has a data structure of B-tree.

7. The fast index creation system for a cloud big data database according to claim 2, wherein the at least one temporary index table, the cache index table and the index table has a data structure of B-tree.

8. The fast index creation system for a cloud big data database according to claim 3, wherein the at least one temporary index table, the cache index table and the index table has a data structure of B-tree.

9. The fast index creation system for a cloud big data database according to claim 4, wherein the at least one temporary index table, the cache index table and the index table has a data structure of B-tree.

10. The fast index creation system for a cloud big data database according to claim 5, wherein the at least one temporary index table, the cache index table and the index table has a data structure of B-tree.

\* \* \* \* \*